(12) United States Patent
Rahmaniani et al.

(10) Patent No.: US 12,026,718 B1
(45) Date of Patent: Jul. 2, 2024

(54) LOW LATENCY ANOMALY DETECTION AND RELATED MITIGATION ACTION

(71) Applicant: Amazon Technologies, Inc., Seattle, WA (US)

(72) Inventors: Ragheb Rahmaniani, Seattle, WA (US); Kalpit Deewan, Kirkland, WA (US); Subhas Chandra Dey, Redmond, WA (US); Shubhankar Ajit Kothari, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 165 days.

(21) Appl. No.: 17/532,142

(22) Filed: Nov. 22, 2021

(51) Int. Cl.
*G06Q 20/40* (2012.01)
*G06N 20/00* (2019.01)

(52) U.S. Cl.
CPC ......... *G06Q 20/4016* (2013.01); *G06N 20/00* (2019.01)

(58) Field of Classification Search
CPC ................................. G06Q 20/4016
USPC ......................................................... 705/44
See application file for complete search history.

(56) References Cited

U.S. PATENT DOCUMENTS

| | | | | |
|---|---|---|---|---|
| 2020/0167783 | A1* | 5/2020 | Bermudez | G06F 16/22 |
| 2020/0167784 | A1* | 5/2020 | Kursun | G06Q 20/4016 |
| 2020/0167785 | A1* | 5/2020 | Kursun | H04L 43/045 |
| 2020/0167786 | A1* | 5/2020 | Kursun | H04L 63/08 |
| 2020/0167787 | A1* | 5/2020 | Kursun | H04L 67/306 |

* cited by examiner

*Primary Examiner* — Lindsay M Maguire
(74) *Attorney, Agent, or Firm* — Kilpatrick Townsend & Stockton LLP

(57) ABSTRACT

Anomalies can be detected and related mitigation actions can be executed. For example, a computing device receives, from a first source, first data associated with a first process of a payment service in support of transactions of a first plurality of users. The computing device generates first aggregated metrics based on the first data. The computing device determines, by using the first aggregated metrics as first input to a machine learning engine, an anomaly associated with the execution of the first process. The computing device determines, based on the anomaly and a history of anomalies associated with the execution of the first process, an indication of an outage associated with the first process. The computing device causes an execution of a mitigation action based on the indication of the outage. The execution of the mitigation action is in support of transactions of a second plurality of users.

20 Claims, 13 Drawing Sheets

US 12,026,718 B1

LOW LATENCY ANOMALY DETECTION AND RELATED MITIGATION ACTION

BACKGROUND

Transactions can be performed through online systems with various processing components. Each of the processing components may handle large amounts of data and multiple use cases simultaneously. Accordingly, unexpected behavior, such as an anomaly or outage, in one of the processing components may be difficult to detect and mitigate in a relatively short period of time.

BRIEF DESCRIPTION OF THE DRAWINGS

Various embodiments in accordance with the present disclosure will be described with reference to the drawings, in which.

DETAILED DESCRIPTION

Figure 1:
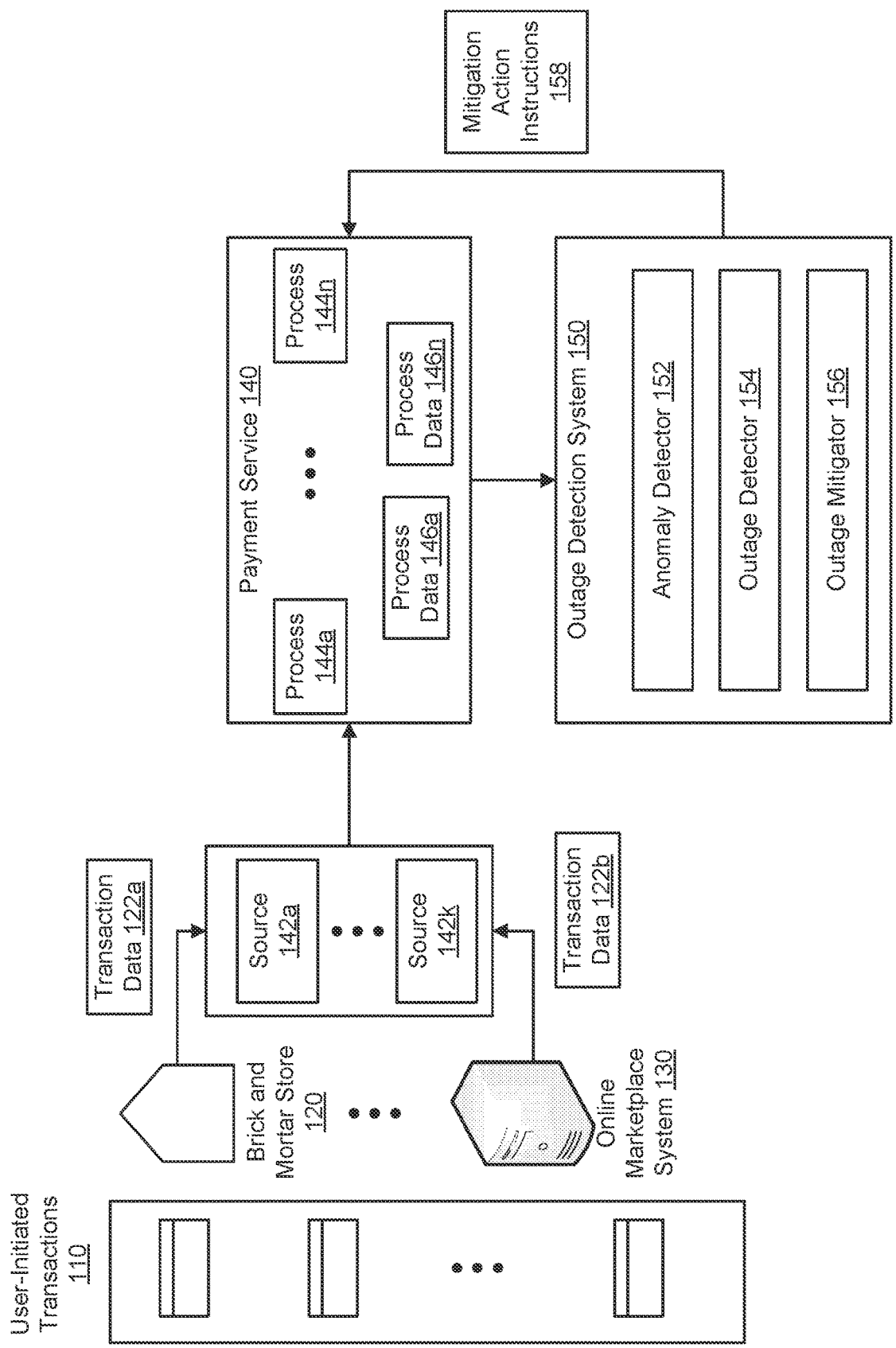
FIG. 1 illustrates an example of a system for detecting an anomaly of a payment service, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, accurate, low latency anomaly detection and related mitigation action in real time or near real time. In an example, a computer system receives first data associated with a process of a payment service from a source that executes the process in support of transactions of a first set of users. The computer system generates second data by transforming the data according to predefined fields. From the second data, and based on a metrics configuration associated with the process, the computer system generates aggregated metrics. The computer system uses the aggregated metrics as input to a machine learning engine to determine whether an anomaly is associated with the execution of the process. Upon determining that the execution of the process is associated with the anomaly, the computer system determines an indication of an outage associated with the process. The indication of the outage is determined based on the anomaly, a history of anomalies associated with the execution of the process and based on attributes of the transactions. The computer system causes an execution of a mitigation action based on the indication of the outage. The mitigation action may be based on a cause and severity of the anomaly. The mitigation action can involve executing the process on a different source in support of transactions of a second set of users. In an example, the payment service includes multiple processes and the computer system can receive data, generate aggregated metrics, detect anomalies, determine outages, and determine mitigation actions for each process independently of the other processes. Additionally, the computer system may determine anomalies or outages at different granularity levels (e.g., geographic region, payment method, business, or partner).

To illustrate, consider a payment service that handles online transactions. A user can initiate an online transaction from their computing device. Data associated with the transaction can be processed by one or more processes of the payment service, each associated with a different aspect of the transaction. For example, user-related data can be processed by an authentication process that is executing on a server and that is responsible for authenticating the transaction. The process can generate authentication data that can be sent to an outage detection system. The outage detection system receives the authentication data and similar authentication data related to transactions of many other users and collected over a unit of time (e.g., one minute), transforms the received authentication data into predefined fields associated with the authentication process, and generates aggregated authentication metrics from the transformed data according to an authentication-metrics configuration. Then, the aggregated authentication metrics are input into an instance of a machine learning model trained for detecting authentication-related anomalies. The instance of the machine learning model determines whether the aggregated authentication metrics are indicative of an anomaly in the execution of the authentication process. The instance of the machine learning model outputs the indication of the anomaly, a cause of the anomaly, an anomaly score, and a threshold. The outage detection system uses the anomaly, a history of anomalies for the execution of the authentication process (which can be similarly detected from previously processed authentication data over a period of time, such as the last ten minutes), the anomaly score, and the threshold to determine whether there is an indication of an outage associated with the authentication process. Upon determining there is the indication of the outage, the execution of the authentication process can be moved to another server. Upon determining the outage is over, the computer system can gradually move the authentication process back to the original server.

Embodiments of the present disclosure may provide technical improvements over conventional techniques for detecting anomalies and executing mitigation actions. For example, this process may be performed automatically from end-to-end, without a need for an operator to manually determine, root cause, and implement a mitigation action. As a result, resources experiencing issues may be identified, disabled, and fixed in less time, thereby reducing an impact of the outage to the payment service. Further, transaction related data generated by a source (e.g., the server executing the authentication process in the above example) can be provided in real-time (e.g., as soon as it is generated, where real-time accounts for any network and/or processing latency) to the outage detection system. This system also in near real-time (e.g., within a few milliseconds, a few seconds, or a few minutes due to processing latency) can determine an anomaly and possibly an outage. As such, the relevant mitigation action can be triggered automatically in near-real time such that a transaction of a user need not be interrupted or, if delayed, it would be delayed by a relatively short period of time (e.g., a few milliseconds, a few seconds, or a few minutes due to the processing latency). As such, the overall experience of the user and/or to any other party of the transaction (e.g., the merchant) is improved, whereby the transaction is processed uninterruptedly, securely, and properly.

FIG. 1 illustrates an example of a system for detecting an anomaly of a payment service, according to an embodiment of the present disclosure. As illustrated in FIG. 1, user-initiated transactions 110 are performed and transaction data 122a-b is sent to a payment service 140. The payment service 140 can be a computing system associated with an entity that processes the user-initiated transactions 110. The user-initiated transactions 110 can be performed at multiple locations, such as a brick and mortar store 120 or through an online marketplace system 130 that offers items for purchase. The user-initiated transactions 110 are performed using a payment instrument that can be processed online over a network. For example, the user-initiated transactions 110 are illustrated as being performed with credit cards, but other methods of online payment (e.g., cryptocurrency, reward points, gift cards, and the like) may be possible.

The systems involved in receiving the user-initiated transactions 110 (e.g., point of sale systems) can then send the transaction data (shown as transaction data 122a and transaction data 122b) to a set of sources (the figure shows source 142a through source 142k for a total of "k" sources). The transaction data 122a-b can include information about the transaction, such as a payment amount, payment-method information (e.g., credit card number, expiration date, etc.), user information, item information, merchant information, and the like. Each of the sources 142a-k may be a computer system (e.g., a set of servers that can be implemented in hardware and/or virtualized) that collects the transaction data from the systems and sends the collected data to the payment service 140. The payment service 140 can execute (e.g., on servers or using services of third parties (e.g., via application programming interfaces APIs) processes (illustrated as process 146a through 146n). The processes 144a-n can include a payment method and common data process, an authentication process, a verification process, a funding source process, a charge or authorization process, an incremental authorization process, a capture process, a refund process, and a disbursement process. As the transaction data is processed, the processes can generate process data 146a-n. The payment service 140 can send the process data 146a-n to an outage detection system 150. Although FIG. 1 illustrates the sources 142a-k as being separate from the payment service 140, some or all these sources 142a-k can be components of the payment service 140 (e.g., implemented on servers of the payment service 140).

In an example, the process data 146a-n is transformed data generated by the processes 144a-n. The process data 146a-n includes predefined fields based on the corresponding process 144a-n. The process data 146a-n for each of the processes 144a-n may include different predefined fields. Transforming the transaction data 122a-b into the process data 146a-n can put the transaction data 122a-n into a usable format for the outage detection system 150. Upon receiving the process data 146a-n, an anomaly detector 152 of the outage detection system 150 determines whether an execution of each of the processes 144a-n is associated with an anomaly, or an unexpected observation in the process data 146a-n that does not conform with past and/or expected behavior of the process data 146a-n. The anomaly detector 152 can include a machine learning engine that receives aggregated metrics included in the process data 146a-n to determine whether each of the processes 144a-n is associated with an anomaly. The aggregated metrics for each of the processes 144a-n may be different.

If the anomaly detector 152 determines a process is associated with an anomaly, an outage detector 154 of the outage detection system 150 determines whether the anomaly is likely to be associated with an indication of an outage. This detection can be based on a history of anomalies detected for the process. The history can span a recent period of time (e.g., the last ten minutes, the last hour, and the like). The indication can be an actual detection of an outage, a likelihood that an outage has occurred, and/or a likelihood that an outage is to occur. If the anomaly detector 152 determines no anomaly is associated with the execution of the process, the execution of the process can continue on the source currently executing the process. The indication of the outage may be detected at different granularity levels associated with the execution of the process, such as a geographic region, a type of transactions, a service associated with the process (e.g., a service provided by a third party or a partner to the payment service 140), a combination thereof, etc. The outage detector 154 may use a regression tree (or some other model) for the anomaly and the history of anomalies associated with the execution of the process to determine that the anomaly is indicative of an outage associated with the process. For example, upon determining that the process data 146a for the process 144a for the transaction data 122a is associated with an anomaly, the outage detector 154 can determine whether a number of anomalies in historical data associated with the execution of the process 144a within a predetermined time period exceeds a threshold. If so, the outage detector 154 determines that the anomaly is indicative of an outage associated with the execution of the process 144a.

In an example, based on the indication of the outage, an outage mitigator 156 of the outage detection system 150 causes an execution of a mitigation action for the outage. The outage mitigator 156 may determine the mitigation action based on a cause of the anomaly(ies) and/or outage. For example, a first cause may be associated with a first mitigation action and a second cause may be associated with a second mitigation action. The mitigation action may involve moving some or all of the process to a different server or service that can execute the process. For example, the outage mitigator 156 can determine that the process 144a is to be moved from a current server to another one of the payment service 140 or to a service of a third party in support of transactions of a second set of users. The outage mitigator 156 outputs mitigation action instructions 158 as a notification message to the payment service 140 indicating the mitigation action and the process, and the payment service 140 performs the mitigation action. The granularity level of the indication of the outage may additionally be included in the mitigation action instructions 158. The payment service 140 can then continue monitoring the user-initiated transactions 110 to determine when no further anomaly is detected for the process and the mitigation action can be stopped.

Figure 2:
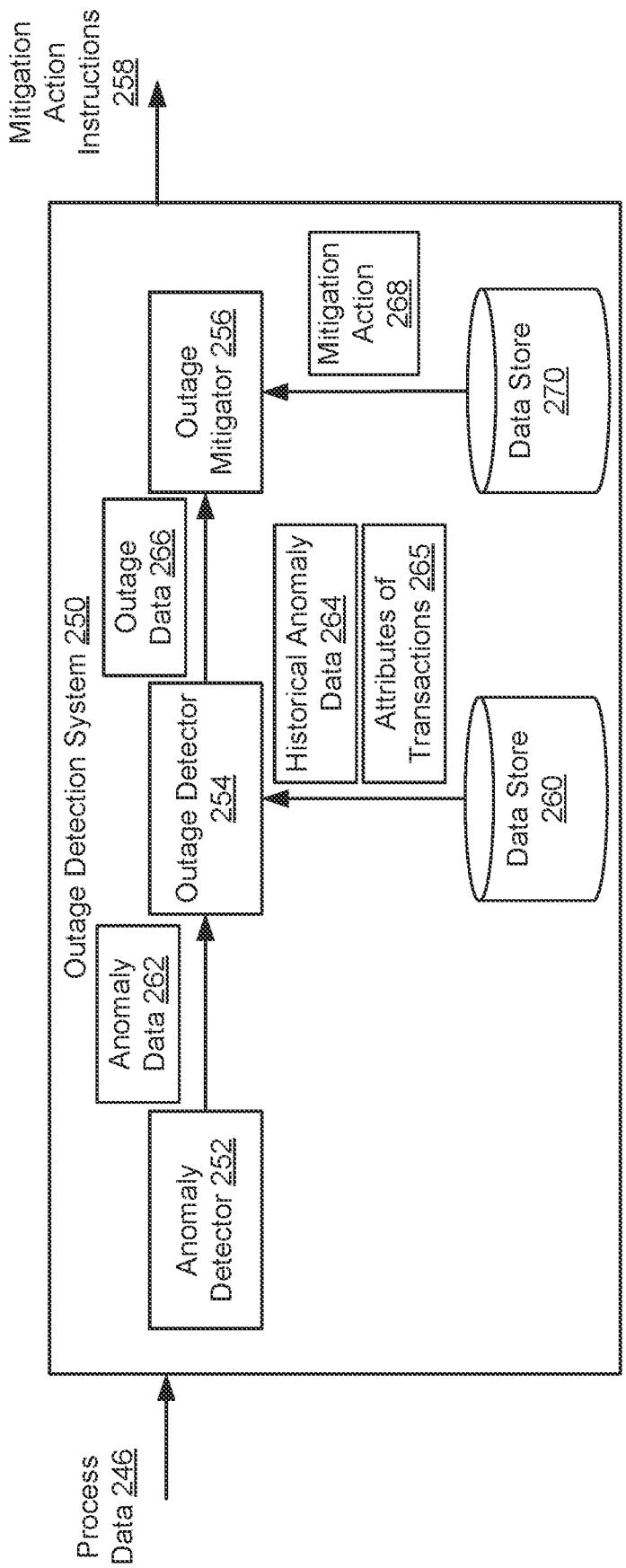
FIG. 2 illustrates a block diagram of an example of an outage detection system detecting an indication of an outage and determining a mitigation action, according to an embodiment of the present disclosure.

FIG. 2 illustrates a block diagram of an example of an outage detection system 250 detecting an indication of an outage and determining a mitigation action, according to an embodiment of the present disclosure. The outage detection system 250 is an example of the outage detection system 150 in FIG. 1.

In an example, an anomaly detector 252 receives process data 246. The process data 246 includes aggregated metrics of a process of a payment service. The anomaly detector 252 can include a machine learning engine that determines whether an anomaly is associated with the execution of the process. If the anomaly detector 252 determines an anomaly is associated with the execution of the process, the anomaly detector 252 sends anomaly data 262 indicating the anomaly to an outage detector 254.

The outage detector 254 receives the anomaly data 262 and determines whether an indication of an outage is associated with the process. The outage detector 254 can determine the indication of the outage based on the anomaly data 262, historical anomaly data 264 received from a data store 260, and attributes of transactions 265 (e.g., the number of transactions 265 that are impacted and/or the total value of such transactions) received from the data store 260. The data store 260 may be local to the outage detection system 250 or remote from the outage detection system 250. If the historical anomaly data 264 indicates that multiple anomalies have been detected within a predefined time period, the outage detector 254 can determine that there is an indication of an outage for the process. Additionally or alternatively, if the attributes of transactions 265 indicates that the number of transactions exceeds a threshold number and/or the total value exceeds a second threshold value, the outage detector 254 can determine there is an indication of an outage for the process. Upon determining the indication of the outage is associated with the process, the outage detector 254 sends outage data 266 including the indication of the outage to an outage mitigator 256.

In an example, the outage mitigator 256 receives the outage data 266 and determines mitigation action instructions 258. The outage mitigator 256 can access a data store 270 to determine a mitigation action 268 for the outage. The data store 270 may be local to the outage detection system 250 or remote from the outage detection system 250. The data store 270 may be a lookup table of causes of anomalies and/or outages associated with mitigation actions that the outage mitigator 256 can use to determine the mitigation action 268. Alternatively, a machine learning model can be used, where this model receives the outage data 266 and determines the mitigation action 268. Upon the outage mitigator 256 determining the mitigation action 268, the outage mitigator 256 can generate mitigation action instructions 258 that can be output (e.g., to a payment service) to cause the mitigation action 268 to be executed for the process.

Figure 3:
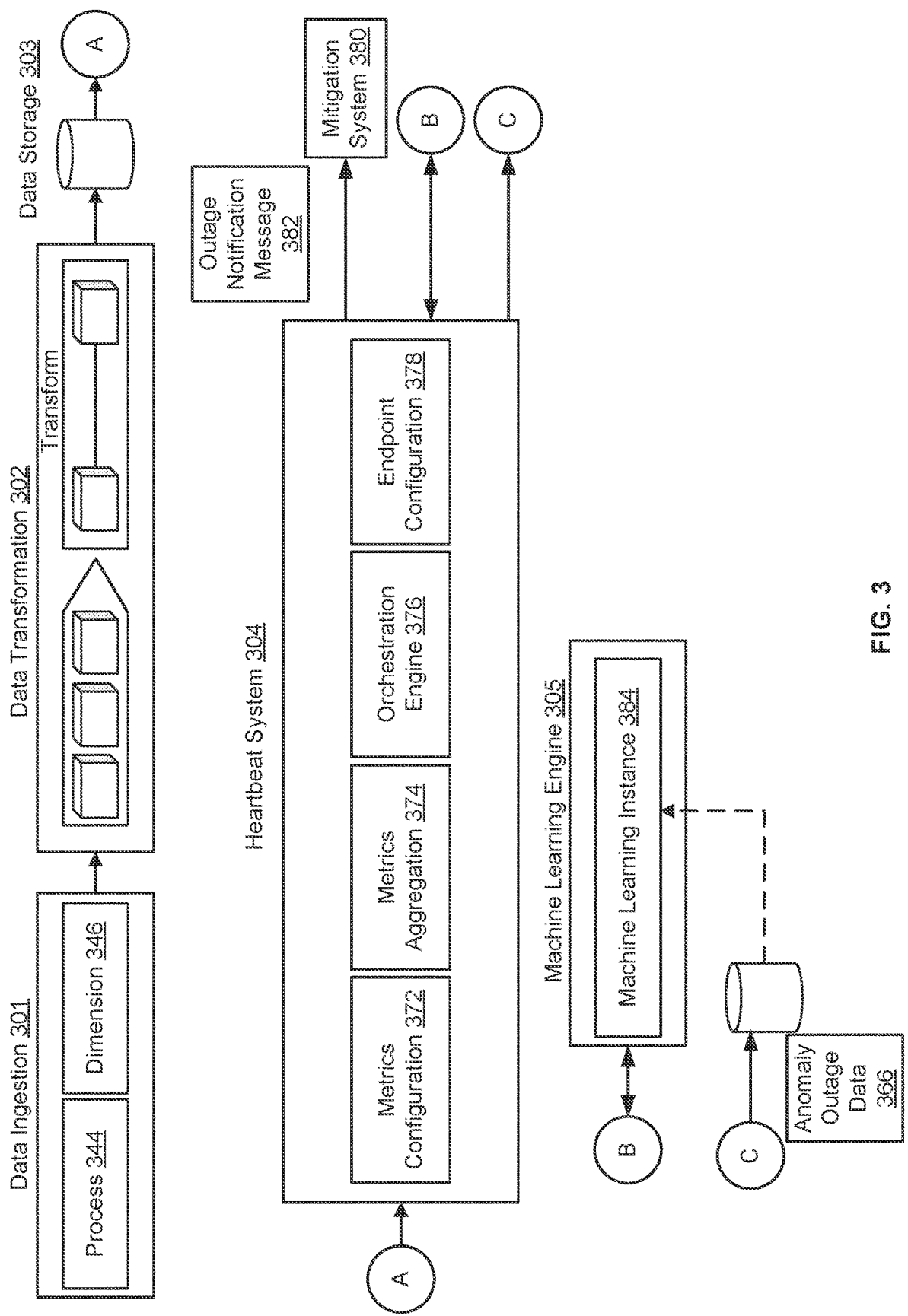
FIG. 3 illustrates a block diagram of an example of an outage detection system detecting an indication of an outage for one process, according to an embodiment of the present disclosure.

FIG. 3 illustrates a block diagram of an example of an outage detection system detecting an indication of an outage for a process, according to an embodiment of the present disclosure. The outage detection system can correspond to the outage detection system 150 in FIG. 1 or the outage detection system 250 in FIG. 2. During data ingestion 301, an indication of a process 344 and a corresponding dimension 346 are received. The dimension 346 can indicate different fields of transaction data that are collected for processing by the process 344. Such transaction is received from the relevant source(s) during the data ingestion 301 for processing by the process 344.

In an example, data transformation 302 is performed on the received transaction data. This data can be transformed into predefined fields, which may be specified for the process 344. The data transformation 302 may occur at predefined intervals, such as every three seconds (or some other predefined time unit intervals). The transformed data can then be stored during data storage 303. Additionally, the transformed data can be input from storage to a heartbeat system 304, as indicated by "A," at a same processing rate (e.g., very three seconds) or a different processing rate (e.g., every one minute or some other predefined time unit intervals). The heartbeat system 304 can use a metrics configuration 372 that indicates metrics of the transformed data that are to be aggregated for the process 344. According to the metrics configuration 372, the heartbeat system 304 can generate a metrics aggregation 374 (e.g., aggregated data that has been generated from transformed data stored in the data storage 303 according to the metrics configuration 372). The heartbeat system 304 can also include an endpoint configuration 378 that indicates an endpoint and a data processing rate for processing the metrics aggregation 374. The endpoint can be a machine learning instance 384 of a machine learning engine 305. The heartbeat system 304 can send the metrics aggregation 374 to the machine learning instance 384 according to the data processing rate, as indicated by "B".

In an example, the machine learning instance 384 can determine whether there is an anomaly associated with the process 344 based on the metrics aggregation 374. The machine learning engine 305 can send a response to an orchestration engine 376 of the heartbeat system 304, also illustrated by "B". If no anomaly is detected, the response indicates so. Otherwise, the response includes anomaly data about the detected anomaly, such as a type of the anomaly, a cause of the anomaly, an anomaly score, and/or a threshold (used in detecting the anomaly or usable to detect an outage). The orchestration engine 376 also receives historical anomaly data for the process 344 to determine, based on the response and a history of anomalies (or a history of responses), whether there is an indication of an outage.

If an indication of an outage is detected, the orchestration engine 376 can send an outage notification message 382 to a mitigation system 380. The orchestration engine 376 may only send the outage notification message 382 if the outage is determined to be an external outage. Otherwise, the outage is internal (e.g., due to a failure or improper behavior of a component of the outage detection system). In this case, the orchestration engine 376 can suppress the outage notification message 382. The outage notification message 382 can include the indication of the outage, where this message can include different information about the outage (e.g., the cause, the type, the region, the service, the stage, the time duration, the confidence score/likelihood of the detection, the process identifier, and the like). The mitigation system 380 can then determine a mitigation action and cause the mitigation action to be executed. The orchestration engine 376 can also send anomaly and/or outage data 366, illustrated by "C" to a data store. The anomaly and/or outage data 366 may be used to further train the machine learning instance 384.

Figure 4A:
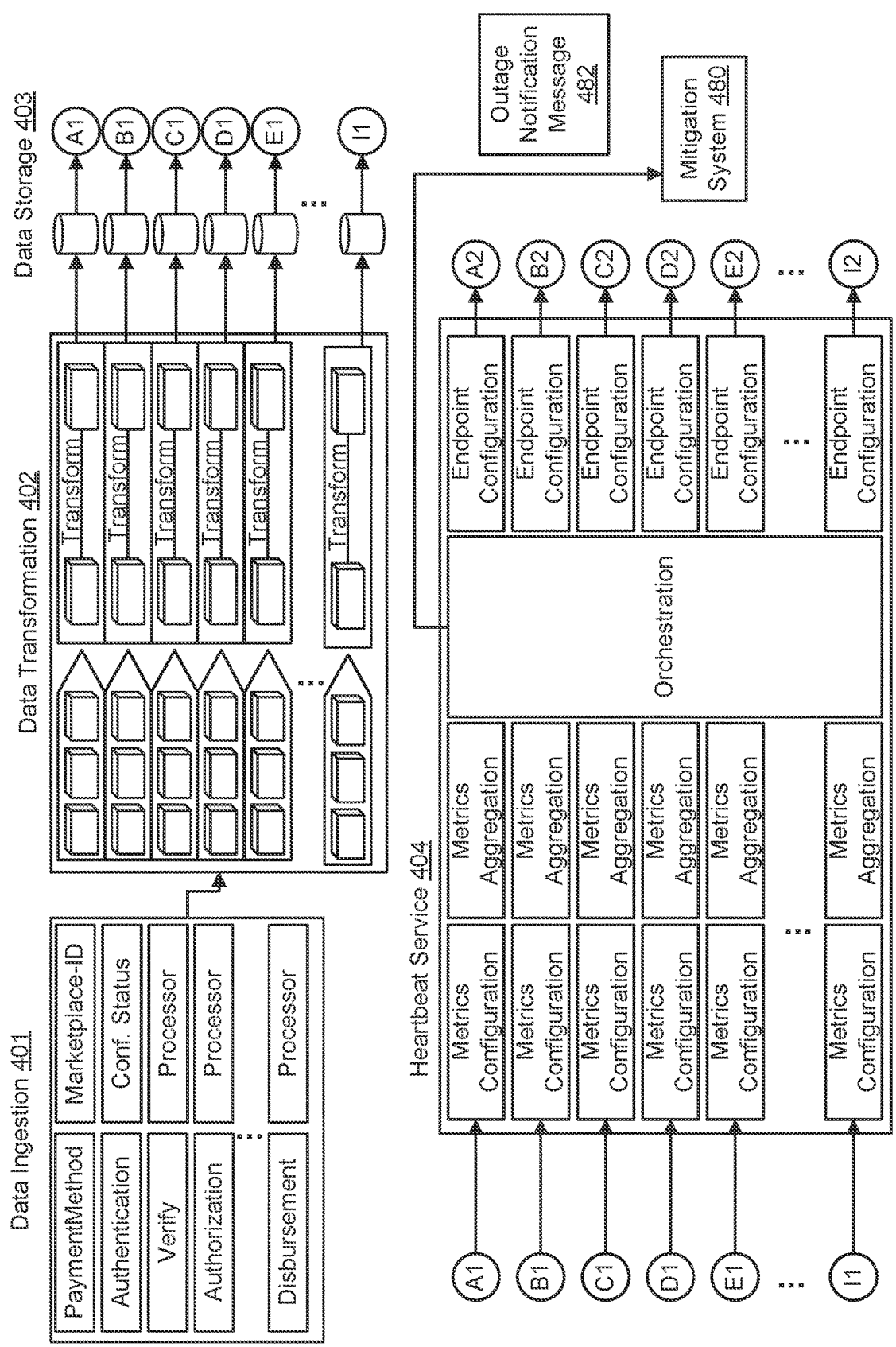
FIGS. 4A and 4B illustrate a block diagram of an example of an outage detection system detecting an indication of an outage for various processes, according to an embodiment of the present disclosure.
Figure 4B:
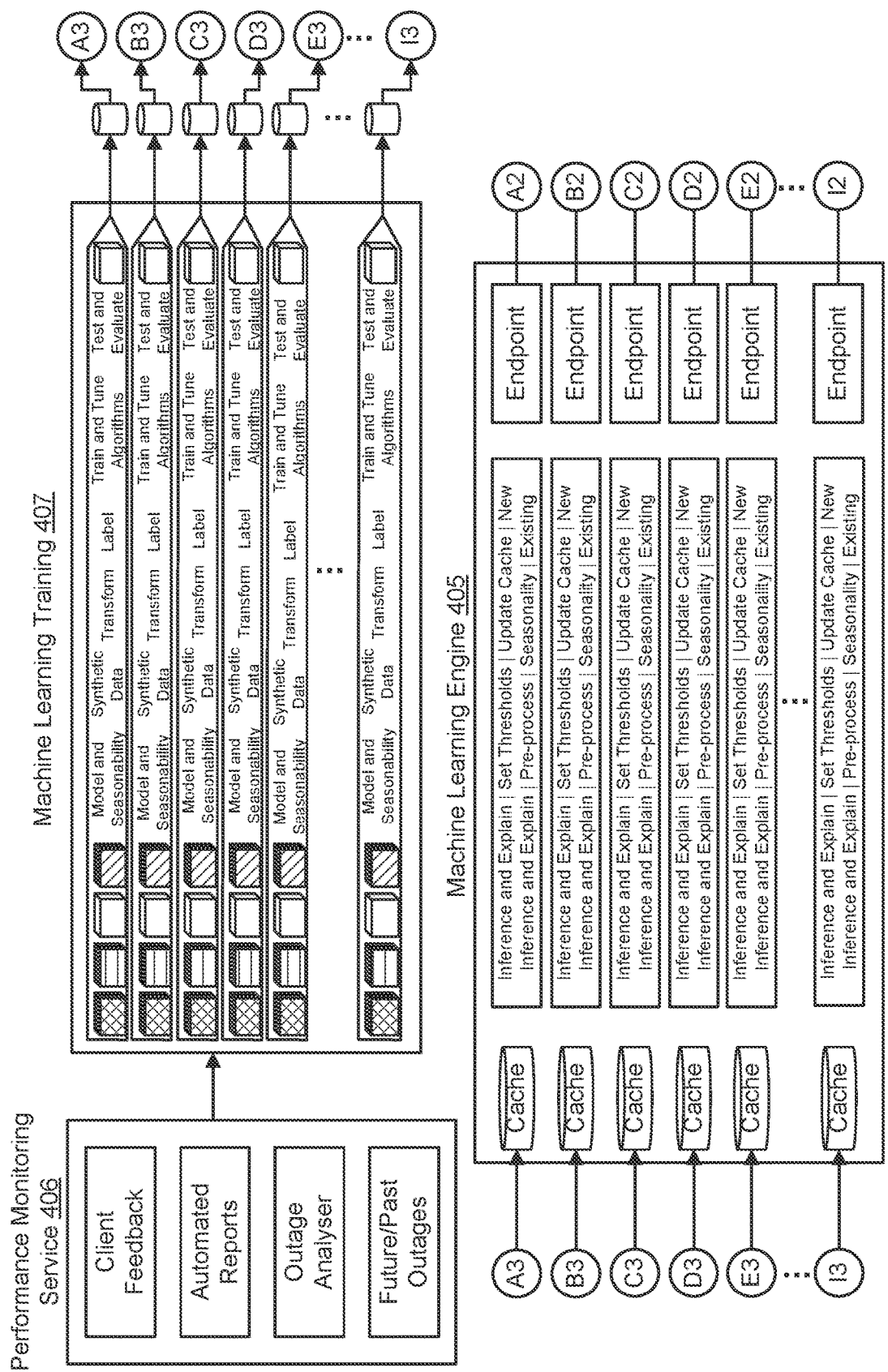

FIGS. 4A-4B illustrates a block diagram of an example of an outage detection system detecting an indication of an outage for multiple processes, according to an embodiment of the present disclosure. The outage detection system can automatically identify outages and feed in an outage signal to a mitigation system 480. The mitigation system 480 evaluates a cause of the outage based on an input from the outage signal and applies a mitigation automatically. Once the outage is resolved, the outage detection system feeds a resolved signal to the mitigation system 480, which brings back the system to its original state (e.g., before the outage) gradually. This approach can minimize the outage impact to several minutes and keep a user's journey smooth even when there is an outage in an external partner or any other relevant dimension. This approach can also limit a financial impact of outages to a payment service.

The outage detection system can automatically detect outages across various dimensions (e.g., payment processor, payment method, operations, businesses, and marketplaces) or processes within multiple outage data points with different levels of granularity. One data point may be as granular as one minute or more based on a transaction volume, a number of pending transactions, a number of terminal responses (e.g., declined), an increased latency, or a reason code from a processor. The outage detection system can also identify new dimensions (e.g., new payment method, payment processors), capture various events (e.g., service logs, data streams, API calls), convert the events to heartbeat metrics (e.g., number of pending executions, latency, etc.), automatically detect anomalies at a granular level with increased accuracy and speed, provide root cause (e.g., the affected component and type of the outage), and automatically trigger the mitigation system 480 for applying an appropriate mitigation lever(s).

Starting from data ingestion 401, each source that is to be monitored for outages emits its system events. For example, in an authentication source, an event includes the detailed information about the type of authentication, business identifier (ID), marketplace, etc. Then, the data ingestion pipeline consumes the events, applies some transformation during data transformation 402 to convert the data fields into a unified model. The events are stored in a data store from where a heartbeat service 404 consumes them. The heartbeat service 404, at pre-scheduled intervals (e.g., once every minute), reads the new resource events and extracts the metrics, such as volume, percentiles of latency, rate of decline, and so on. Then, the metrics are aggregated and sent to a machine learning endpoint of a machine learning engine 405 based on an endpoint configuration of the process. Machine learning model instances of the machine learning engine 405 are training using machine learning training 407. The machine learning endpoint is associated with the process and returns an anomaly score, thresholds, and a root cause of anomaly. The results are calibrated, and if an outage is observed, the outage triggers the mitigation system 480. The metrics and anomaly scores are stored in a data store. A performance monitoring service 406 then, on a scheduled cadence, fetches the data and calculates performance metrics (e.g., false positive rate, false negative rate, time to detect, etc.) and business metrics (e.g., financial risk, customer impact, etc.). The performance monitoring service 406 also consumes client feedback in calculating the performance. The performance monitoring service 406 then enriches a training data set of the machine learning training 407 with the observed false positives and false negatives. Whenever a new artifact is created by the machine learning training 407, a corresponding machine learning endpoint is updated. Generally, the processing of the data of one process (e.g., authentication process) is handled independently and, possibly, using a different processing rate than that of another process (e.g., a verification process). As such, there is no cross-process contamination, which mimics how payment services operate.

In an example, during the data ingestion 401, a source emits the events and feeds the data to the data ingestion pipeline. During data transformation 402, the data for each process is transformed into predefined fields. The heartbeat service 403 receives the transformed data and captures metrics for each process according to a metrics configuration. Examples of the metrics include latency, pending rate, decline rate, error rates, volume, dollar value at risk, a count of high value declines, a distribution of response codes, and lagged metrics. Latency can be calculated as q'th quantile over terminated events (e.g., p90 of terminated transactions). Without latency it may not be possible to detect many outage scenarios (e.g., connectivity issues or system overload) and degraded health. Pending rate can be calculated as a sum of open events divided by a total number of events. Without the pending rate metric it may not be possible to detect stuck workflow due to an internal failure which is causing transactions to not reach the partner. Decline rate can be calculated as a sum of declined transactions over a total number of terminated transactions. Without decline rate it may not be possible to detect internal configuration errors or external partner's erroneous responses. Error rates can be calculated as a number of transactions with contradictory responses from external partners over a predefined time period (e.g., past twenty-four hours). Without the error rate metric it may not be possible to prevent double disbursement. Volume can be calculated as a total number of pending and terminated transactions. Without the volume metric it may not be possible to detect an outage for internal businesses. Dollar value at risk can be calculated as a sum of a dollar value over transactions which are in pending, declined, or delayed. Without the dollar value at risk metric it may not be possible to detect partial customer impacting outages. Count high value declines can be calculated as the number of transaction with more than $1000 value which are declined. Without the count high value declines metric it may not be possible to detect cases where high value orders are erroneously declined due to, for example, fraud risk. Distribution of response codes can be calculated as the empirical distribution of the response codes. Without the distribution of response codes metric it may not be possible to detect unexpected system contract changes, such as new response codes. Lagged metrics can be calculated metrics over a longer period of time. Without lagged metrics it may not be possible to detect an outage in low and sparse traffics.

In the heartbeat service 404, the metrics configurations allow the machine learning model instances of the machine learning engine 405 to be tunable by the client, which improves the scalability to new use cases. Specifically, without the metrics configurations, the data generation and performance evaluation of the performance monitoring service 406 cannot be controlled for fine tuning.

During machine learning training 407, a machine learning model instance is trained for each process. Each of the machine learning model instances may be a different instance of the same machine learning model, or may be a different machine learning model. For example, a first instance can be trained based on first training data associated with a first process of the payment service, and a second instance of the machine learning model can be trained based on second training data associated with the second process of the payment service. The training data can be preprocessed with seasonality modeling to improve accuracy. Benchmarking, data labeling, and synthetic data generation can be generalized such that false alarms on expected noise are reduced. Data lifting is also performed to reduce false alarms. For instance, when the decline rate reduces, it may raise alarm while such scenarios do not map to an outage. Synthetic data generation is performed to confidently test the algorithms before release in production. Moreover, with synthetic data the algorithm can learn unseen but plausible patterns. This allows for a high generalization of the algorithms. Heuristic data labeling is also performed to leverage supervised learning or to attain an approximate sense of the performances of the unsupervised machine learning models.

The heartbeat service 404 can send the aggregated metrics for each process to the corresponding endpoint of the machine learning engine 405. Each endpoint can determine outages independently from the other endpoints. As such, each process may have a different processing rate (e.g., ten seconds, one minute, five minutes, etc.) at which the aggregated metrics can be sent to the appropriate endpoint. The machine learning engine 405 can include statistical models (e.g., a default model based on dynamic thresholding) so that the outage detection model can be scalable to automatically provide coverage to new data streams. Additionally, the machine learning engine 405 can include machine learning algorithms trained using supervised, semi-supervised, or unsupervised learning techniques. Such models may be used to independently score the data and then merge the results into a single score. Explainers may be used to determine a root cause for the outages. The machine learning engine 405 can output an indication of the process being associated with an anomaly to the heartbeat service 404.

Calibration is performed by the heartbeat service 404 to determine whether an anomaly is associated with an outage. Without this module, anomalies cannot be mapped to an outage and recommendations cannot be provided. To create alarms with high confidence, machine learning APIs (e.g., fraud risk or payment success likelihood APIs) can be used, which allow the outage detection system to filter out transactions expected to be declined and avoid false alarms when the unexpected impact is not actionable for the source. The calibration may determine multiple outages are detected for multiple processes or at different granularity levels for the same process. The heartbeat service 404 outputs an outage notification message 482 to the mitigation system 480. Without the mitigation system 480, the outage detection system may only perform detection and not prevent or limit the impact during an outage. Without mitigation, it may not be possible to prevent outages by gradually moving away traffic from partners which show degraded health (a sign of outage). The mitigation levers can be integrated in the mitigation system 480 in collaboration with the service owners and the mitigation system 480 can leverage various other mitigation strategies based on the customer or business needs.

The performance monitoring service 406 can determine whether an algorithm is under performing and provide visibility into a health of each process or service. Additionally, the performance monitoring service 406 continuously collects real labeled data from production environment for the self-supervised aspect of the system.

Figure 5:
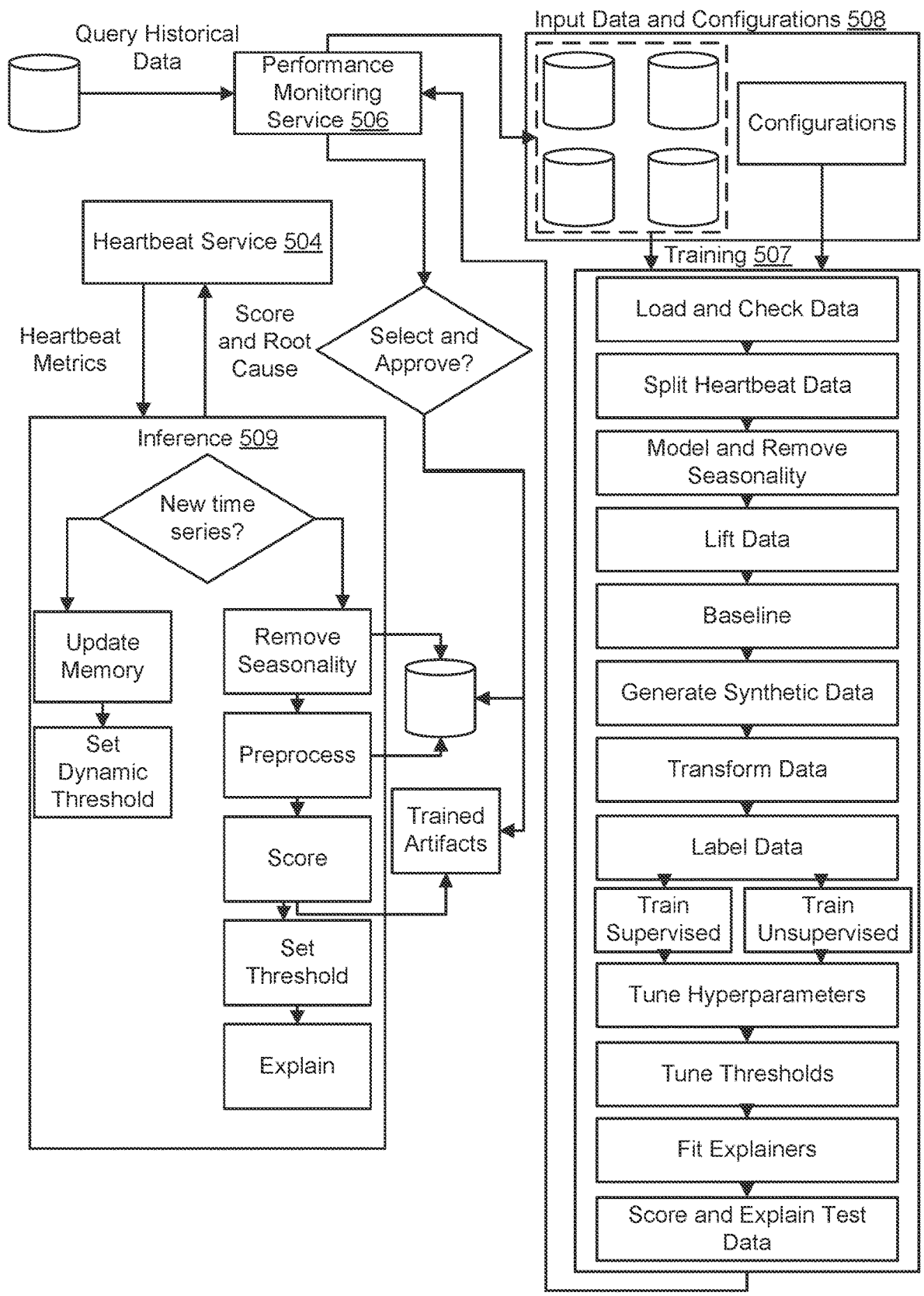
FIG. 5 illustrates a flow diagram of an example of training, inference, and performance monitoring of an outage detection system, according to an embodiment of the present disclosure.

FIG. 5 illustrates a flow diagram of an example of training, inference, and performance monitoring of an outage detection system, according to an embodiment of the present disclosure. Four types of input data from input data and configurations 508 are used to fit machine learning models. The input data and configurations 508 includes training data of historical heartbeat time series data collected from production, low volume data of additional data samples for time series that have low volume and spare traffic, testing data associated to the historical false positives created by the machine learning model, and enriching data associated to the historical false negatives created by the machine learning model. The low volume data, testing data, and enriching data may initially be empty and get populated based on feedback from the production environment allowing for a continuous improvement of performance. To allow for extensibility, a simple configuration file is used in the input data and configurations 508 to provide an interface for tuning of the machine learning models, if needed. Parameters of the configurations can include names of the features which are to be monitored for spikes (e.g., latency) and names of the features that are to be monitored for dips (e.g., volume), the train-test split ratio of the input data (e.g., 70% for training and 30% for testing), seasonality modeling parameters, validation guidelines to provide an estimate on the level of deviation from expected value that might be considered undesired (e.g., the expected success rate deviates by 15%), and default and tuned thresholds for the time series that have been hand-tuned.

During training 507, the input data may be preprocessed so that the machine learning models can effectively learn the underlying patterns and model anomalies. Additionally, seasonality may be modeled and removed. Seasonality is expected variations in the time series data that occur at specific regular intervals, such as daily, weekly, monthly, or quarterly. Most of the heartbeat metrics are stationary in the undesired direction as trend cannot be an acceptable property for them. For example, a gradual decrease in an approval rate metric may not be acceptable. This hypothesis can be verified using the Augmented Dickey-Fuller test. If the null hypothesis cannot be rejected, readily available libraries can be used to de-trend the feature. Seasonality cycles can be determined to handle seasonality. To determine the seasonality cycles, which may be provided by a user through a configuration interface, the cycle duration for a given feature $k \in K$ satisfies the following equation:

$$l^* = \operatorname{argmin}_{l \in S} \Sigma_{i \in n: i+l \leq n} \Sigma_{k \in K} \|x_i^k - x_{i+l}^k\| \tag{1}$$

where S is the set of possible seasonality cycles, n is the number of input data and $x_i^k$ is the $i^{th}$ value of feature k. This equation evaluates all possible cycle lengths over the training data and selects the cycle length which produces the minimum error. Given l* each data point can be marked with a seasonality indicator m. That is, every pair with the l* units distance from each other in the time series can have a similar marker $m \in [0, l^*)$. Per properties of the seasonality, the data with the same seasonality marker m is expected to have the same value plus some random noise e, that is:

$$x_j^m \approx x_i^m + e_i^m \forall (i,j) \in n: i \neq j; m \in [0, l^*) \tag{2}$$

To effectively detect anomalies, the scenarios where the deviation from the expected value is significant enough to signify a potential failure in the application are captured. In other words, the seasonality is to be removed and jumps or dips only in the residual value e are to be detected. To model seasonality, it is acknowledged that the input data likely includes anomalies. Quantile values are used instead of a simple average because quantile values are statistically more immune to outliers. The quantile value, denoted by Q, is specified in the configuration file and can easily be tuned. Using a high Q value can better model the expected value than other existing approaches as the seasonality is imperfect. To capture the seasonal values, for each feature the following algorithm can be applied:

---
Algorithm 1: Modeling the seasonal value of a given feature
---
1: s = { }
2: for m ∈ [0, 1*)S do
3:   if feature in configs.dip_features then
4:     s[m] = (1-Q)$^{th}$ quantile of the values earmarked with m
5:   else
6:     s[m] = Q$^{th}$ quantile of the values earmarked with m
7: return s

---

A smoothing mechanism (e.g., rolling mean) can be applied over the seasonal values as to improve the stability of the machine learning models. Given the robust expected seasonal value for m∈[0, 1*), the seasonal value can be subtracted from the input data to obtain the expected value (or residual):

$$e_i^m = x_i^m - s[m] \forall i \in n, m \in [0, l^*] \quad (3)$$

Each time series may not have enough data to model one complete seasonality cycle. For such cases, the s vector can be forward and then backward imputed. For the multi-seasonal patterns (e.g., weekly and daily), this process can be repeated for each seasonality cycle in the order. Finally, Q can be tuned based on knowledge of contamination level in the data and by increasing the Q value, we can reduce the noise in residuals e.

For anomaly detection, anomalies should be captured in the undesired direction. However, unsupervised algorithms still mark the desired behaviors of such feature as anomaly. To cope with this, we lift the data using:

$$e_i^m = \max(0, e_i^m) \text{ for spiking features; and } e_i^m = \min(0, e_i^m) \text{ for dipping features.} \quad (4)$$

Once the data is cleaned out from noise, we a baseline (or expected residual) can be set for each metric using $\bar{e}^k = \Sigma_{i \in n} e_i^k / n$. $\bar{e}^k$ is used for the validation and synthetic data generation.

To effectively train an anomaly detection machine learning model, a set of data that potentially captures all the possible states is used. Likewise, various scenarios of anomaly are included to properly tune and test the algorithm. The input data for many time series is sparse, low volume and in some cases lacks of anomaly examples. A feedback loop that collects data from the production environment can improve this problem. But, the feedback mechanism may collect data slowly or only after observing a failure. So, additional synthetic data can be generated. To this end, for feature k∈K, 1* data points are generated using the following equation:

$$y^k \sim U(0, \epsilon + \bar{e}^k) \gamma) \quad (5)$$

where $\bar{e}^k$ is the baseline value of the given feature k, U is the uniform distribution, and $\epsilon$ and $\gamma$ are the input configuration parameters. A similar mechanism is used to generate the fake outages:

$$y^k \sim U(0.5(\epsilon + \bar{e}^k)\gamma, 2.5(\epsilon + \bar{e}^k)\gamma) \quad (6)$$

All the generated data points by equation (6) may not be an anomaly. A data transformation technique (e.g., MinMax, log transformation, etc.) can be used to scale the numerical features as they are of different units and scale. The data can then be labeled automatically. Although a clear definition of anomaly for each attribute of the time series may not be known a priori, a tentative label can be assigned to each data point using the baseline values and validation guidelines. To do so, for each attribute k, a residual threshold is calculated by:

For spiking features of type multiplicative: $e_i^k > \epsilon \gamma + (\gamma - 1)\bar{e}^k$     (7)

For dipping features of type multiplicative: $e_i^k < \epsilon \gamma + (\gamma - 1)\bar{e}^k$     (8)

For spiking features of type additive: $e_i^k > \epsilon + \gamma$     (9)

For dipping features of type additive: $e_i^k < -\epsilon - \gamma$     (10)

The metrics with unbounded values are multiplicative and the metrics with known bounds are additive. For example, count and latency metrics are multiplicative and all the rate-based metrics are additive. A data point is marked as anomaly (e.g., 1) if any of its attributes deviate $\gamma$ units from the expected baseline and 0 otherwise.

Although the data is labeled (using feedback loop, synthetic data generation, and the heuristic labeling), supervised algorithms cannot be purely relied on. Because the data can still be severely imbalanced and there might be critical errors in the label. To this end, one unsupervised model and one supervised model are trained for each time series and then an ensemble of the unsupervised model and the supervised model created by averaging the scores is used for recommendations. The ensemble weight may be set through the configuration interface to allow for configurability of underlying recommendations.

Each time series is earmarked with a unique identifier (e.g., a categorical variable) and it is independent from other time series. Encoding the categorical variables (e.g., using one-hot-encoding) is not effective as the unsupervised algorithms cross contaminate different patterns. Hence, the unsupervised algorithm (e.g., isolation forest) is enforced to branch on the categorical variables first. Moreover, as the unsupervised algorithm does not explicitly optimize an objective function, no explicit encoding is needed to create the dichotomy branches. For one unique value for the categorical variable, the normal branching behavior is resumed for the algorithm. This is equivalent to training the algorithm for each time series separately. A default threshold of 0.6 may be used which, if needed, can be fine-tuned through the configuration file. To help root causing an issue, the attribute of the time series which has been the most likely reason for the high anomaly score is highlighted using pre-trained Shaply models.

During inference 509, heartbeat metrics are received from a heartbeat service 504. The inference flow uses pre-trained machine learning models to lift, scale, score, and explain the data point after removing its seasonal component. For new time series that are not associated with a trained algorithm, statistical models, such as dynamic thresholding, may be used. A history is kept (by default for up to 2 weeks) of the incoming traffic in the memory and set threshold using:

$$\text{median}(p) - \alpha \text{MAD}(p) < t < \text{median}(p) + \alpha \text{MAD}(p) \quad (11)$$

where p is the list of data points in memory, $\alpha=3*1.48$ and MAD is the median absolute deviation.

A performance monitoring service 506 calculates various performance metrics to evaluate how each machine learning model performs over time. The machine learning models may be trained until the performance metrics exceed a threshold. An example algorithm to calculate performance metrics is shown herein next:

---

Algorithm 2: Performance validation

1: F1 ← Get F1 score using the labeled inputs, if available
2: F2 ← Get accuracy over data in Testing and Enriching buckets, if available
3: F3 ← Get accuracy over fake anomalies, if available
4: H ← Calculate health (number of marked anomalies divided by sample size)
5: D ← Calculate discrepancy score
6: O ← Get all continuous windows where anomaly has been sustained (for at least Γ data points)
7: tp = 0; f p = 0; td = 0; f d = 0
8: for o ∈ O do
9: $z^-$ Calculate the average value of each attribute during time window o
10: r ← Calculate difference $z^-$ and $e^-$ using the equations
11: if r < 0 then
12: f p = f p + 1
13: f d = f d + |o|
14: else
15: tp = tp + 1
16: td = td + |o|
17: return [F1, F2, F3, H, D, tp, f p, td, f d]

---

Figure 6:
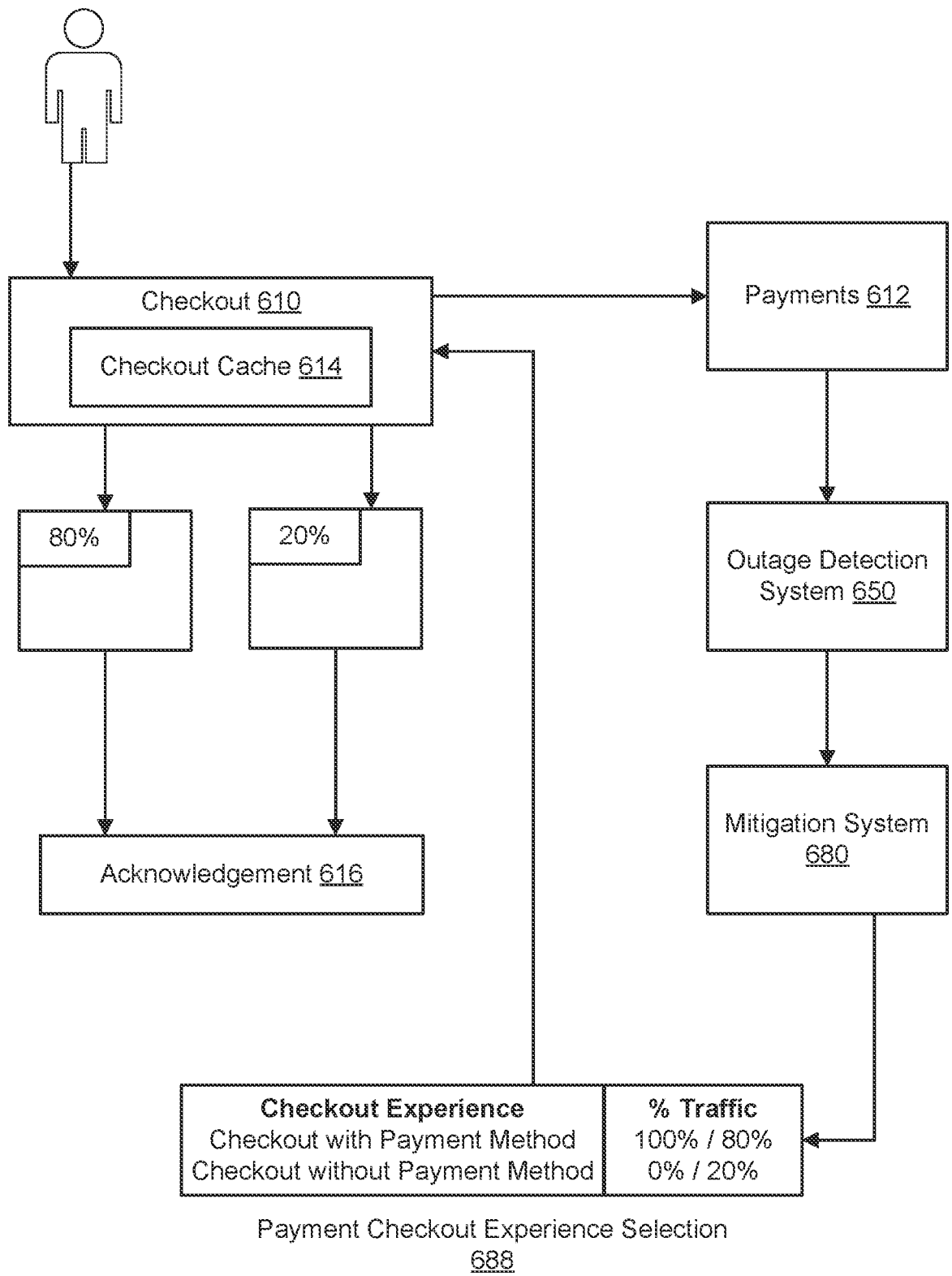
FIG. 6 illustrates a block diagram of an example of causing a mitigation action for a process associated with an indication of an outage, according to an embodiment of the present disclosure.

FIG. 6 illustrates a block diagram of an example of causing a mitigation action for a process associated with an indication of an outage, according to an embodiment of the present disclosure. An outage detection system 650 receives data from payments 612 from multiple users. Based on the data, the outage detection system 650 determines there is an anomaly in 20% of the payments 612, which is indicative of an outage. The outage detection system 650 then sends a notification message to mitigation system, which makes an API call to update a payment checkout experience. A payment checkout experience selection 688 is updated to minimize an outage impact for the users. Prior to determining the indication of the outage, the checkout experience involved 100% of traffic being checked out with a payment method. After the update to the payment checkout experience selection 688, 80% of the traffic is checked out with a payment method and 20% of the traffic is checked out without a payment method. A checkout cache 614 of a checkout 610 is updated to reflect the updated percentages.

For a subsequent checkout, the checkout occurs with a payment method occurs 80% of the time and occurs without a payment method 20% of the time. A user will be shown an acknowledgement 616 that their checkout was successful. Once the outage recovers, a user that checked out without a payment method can be charged using an on-file payment method.

FIGS. 7-11 illustrate processes associated with detecting and mitigating anomalies, according to an embodiment of the present disclosure. Some or all of the processes (or any other processes described herein, or variations, and/or combinations thereof) may be performed under the control of one or more computer systems, such as the outage detection system 150 in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 7:
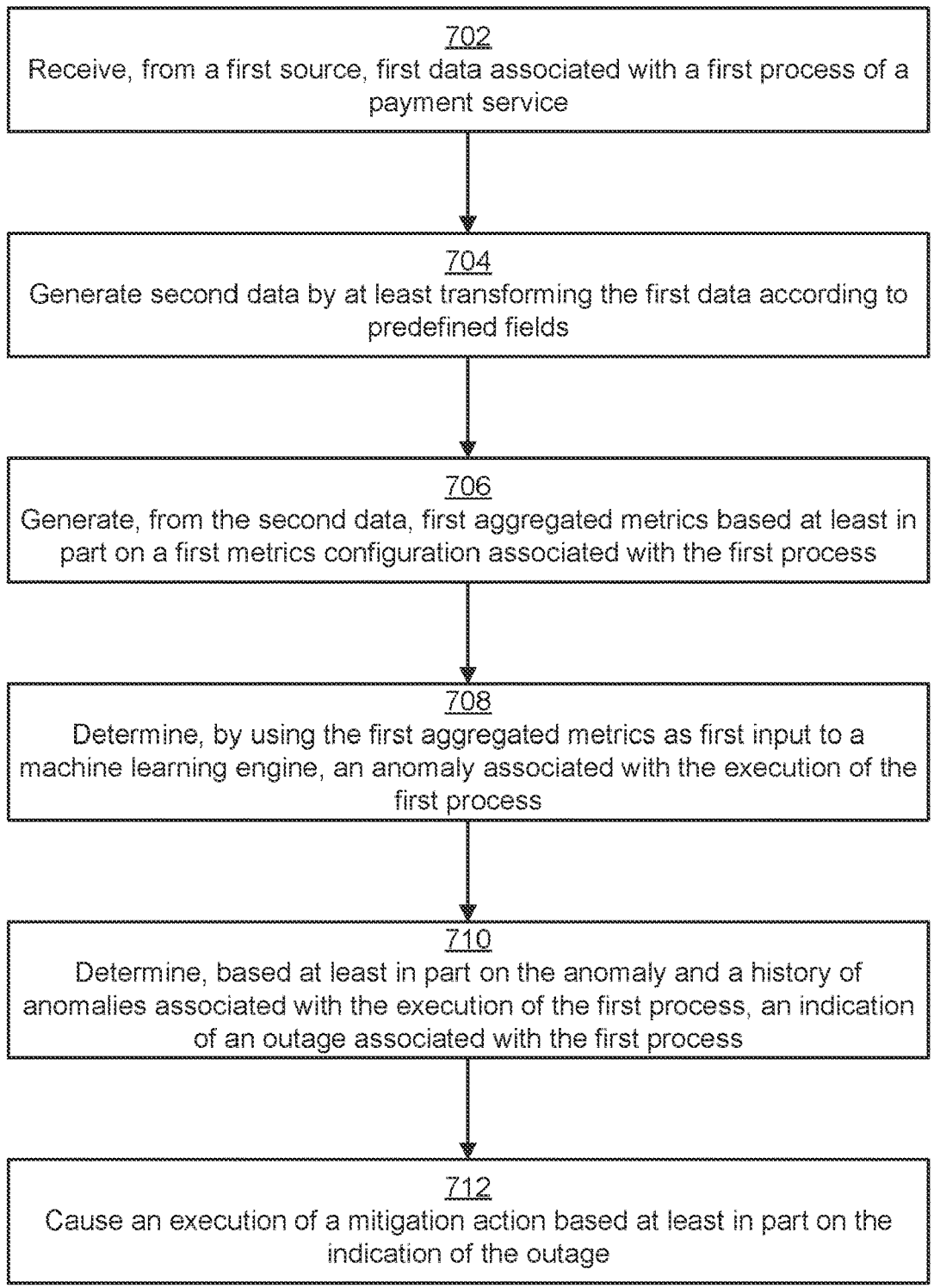
FIG. 7 illustrates an example of a flow for an overall process of detecting and mitigating an outage in a payment service, according to an embodiment of the present disclosure.

FIG. 7 illustrates an example of a flow for an overall process of detecting and mitigating an outage in a payment service, according to an embodiment of the present disclosure. In an example, the flow includes operation 702, where the computer system receives, from a first source, first data associated with a first process of a payment service. The first source can be a server that performs the first process, and the first data can be transaction data associated with a transaction initiated by a user. The first process may be a payment method processing process, an authentication process, an authorization process, a refund process, etc.

In an example, the flow includes operation 704, where the computer system generates second data by at least transforming the first data according to predefined fields. The predefined fields can be particular to the first process. For example, the predefined fields may specify a marketplace identifier, a client identifier, a confirmation status, a category, a processor name, etc.

In an example the flow includes operation 706, where the computer system generates, from the second data, first aggregated metrics based at least in part on a first metrics configuration associated with the first process. The first metrics configuration can specify metrics that are relevant to successful execution of the first process, and the first aggregated metrics can include the specified metrics. Metrics in the second data that are not included in the first metrics configuration may be filtered out of the first aggregated metrics.

In an example, the flow includes operation 708, where the computer system determines, by using the first aggregated metrics as input to a machine learning engine, an anomaly associated with the execution of the first process. The computer system can determine an endpoint configuration that specifies an endpoint of the machine learning engine that corresponds to an instance of a machine learning model that is to be used for the anomaly determination. The computer system can send the first aggregated metrics to the endpoint at a data processing rate associated with the first process. The computer system can receive a response indicating the anomaly from the endpoint.

In an example, the flow includes operation 710, where the computer system determines, based at least in part on the anomaly and a history of anomalies associated with the execution of the first process, an indication of an outage associated with the first process. The computer system may receive a cause of the anomaly, an anomaly score, and a threshold from the machine learning instance. If the anomaly score is above the threshold and the history of anomalies indicates that other anomaly scores have been above the threshold for a predefined period of time, the computer system can determine the indication of the outage associated with the first process.

In an example, the flow includes operation 712, where the computer system causes a mitigation action based at least in part on the indication of the outage. The computer system may determine the mitigation action based on the cause of the anomaly received from the machine learning engine. Different causes may be associated with different mitigation actions, and the computer system can perform a lookup of which mitigation action is associated with the indicated cause of the anomaly. The computer system can send mitigation action instructions to the payment service, which can cause the mitigation action. As an example, the mitigation action may be to move some or all of the first process to a different source.

Figure 8:
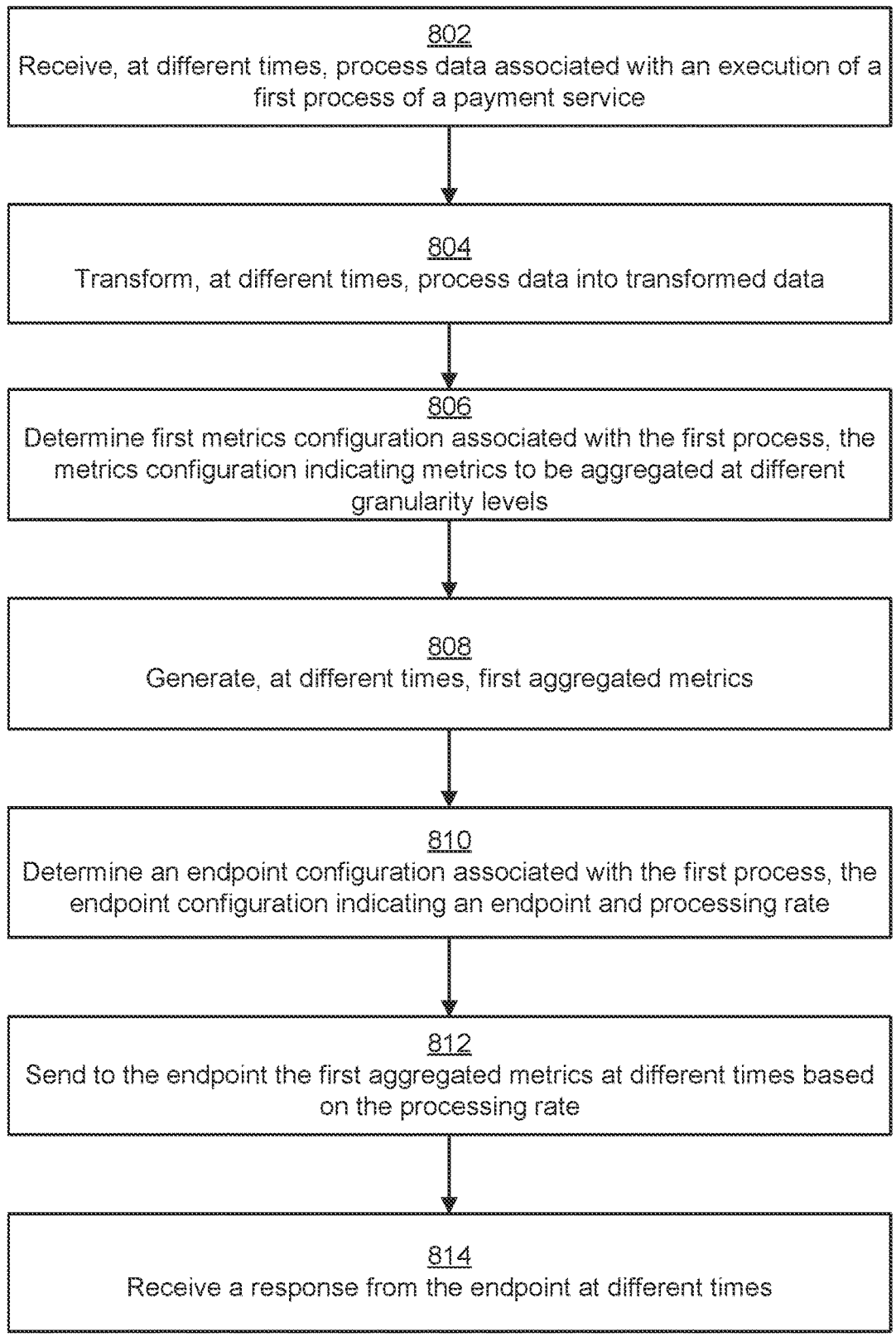
FIG. 8 illustrates an example of a flow for a process of detecting anomalies in a payment service over time, according to an embodiment of the present disclosure.

FIG. 8 illustrates an example of a flow for a process of detecting anomalies in a payment service over time, according to an embodiment of the present disclosure. In an example, the flow includes operation 802, where the computer system receives, at different times, process data associated with an execution of a first process of a payment service. The data may be received at predefined intervals, such as every second. The process data can be received from a source that performs the first process. The process data can include transaction data associated with transactions initiated by users. The first process may be a payment method processing process, an authentication process, an authorization process, a refund process, etc.

In an example, the flow includes operation 804, where the computer system transforms, at different times, the process data into transformed data. The computer system may transform the data at predefined intervals, such as every five seconds. The transformed data can include predefined fields.

In an example, the flow includes operation 806, where the computer system determines a first metrics configuration associated with the first process, the first metrics configuration indicating metrics to be aggregated at different granularity levels. For example, the granularity levels may be based on a geographic region, a partner of the payment service, or a combination thereof. The first metrics configuration can be specific for the first process and a particular granularity level. Other processes and granularity levels may be associated with a different metrics configuration.

In an example, the flow includes operation 808, where the computer system generates, at different times, first aggregated metrics. The computer system may aggregate the metrics at predefined intervals, such as every thirty seconds. The aggregated metrics are aggregated based on the first metrics configuration.

In an example, the flow includes operation 810, where the computer system determines an endpoint configuration associated with the first process. The endpoint configuration can indicate an endpoint and a processing rate. For example, the endpoint configuration can indicate that the endpoint is a first instance of a machine learning model that is trained for the first process and that the computer system is to send the first aggregated metrics to the endpoint every minute.

In an example, the flow includes operation 812, where the computer system sends the first aggregated metrics to the endpoint at different times based on the processing rate. For example, if the processing rate is once every minute, the computer system can send the first aggregated metrics to the endpoint once every minute.

In an example, the flow includes operation 814, where the computer system receives a response from the endpoint at different times. The response may be provided for each reception of the first aggregated metrics, or the response may be sent after multiple sets of the first aggregated metrics have been received and processed. The response can include an indication of an anomaly, or an indication of multiple anomalies, based on the first aggregated metrics. Additionally, the response may include a cause of the anomaly, an anomaly score, and a threshold, which may be used by the computer system to determine an indication of an outage associated with the execution of the first process.

Figure 9:
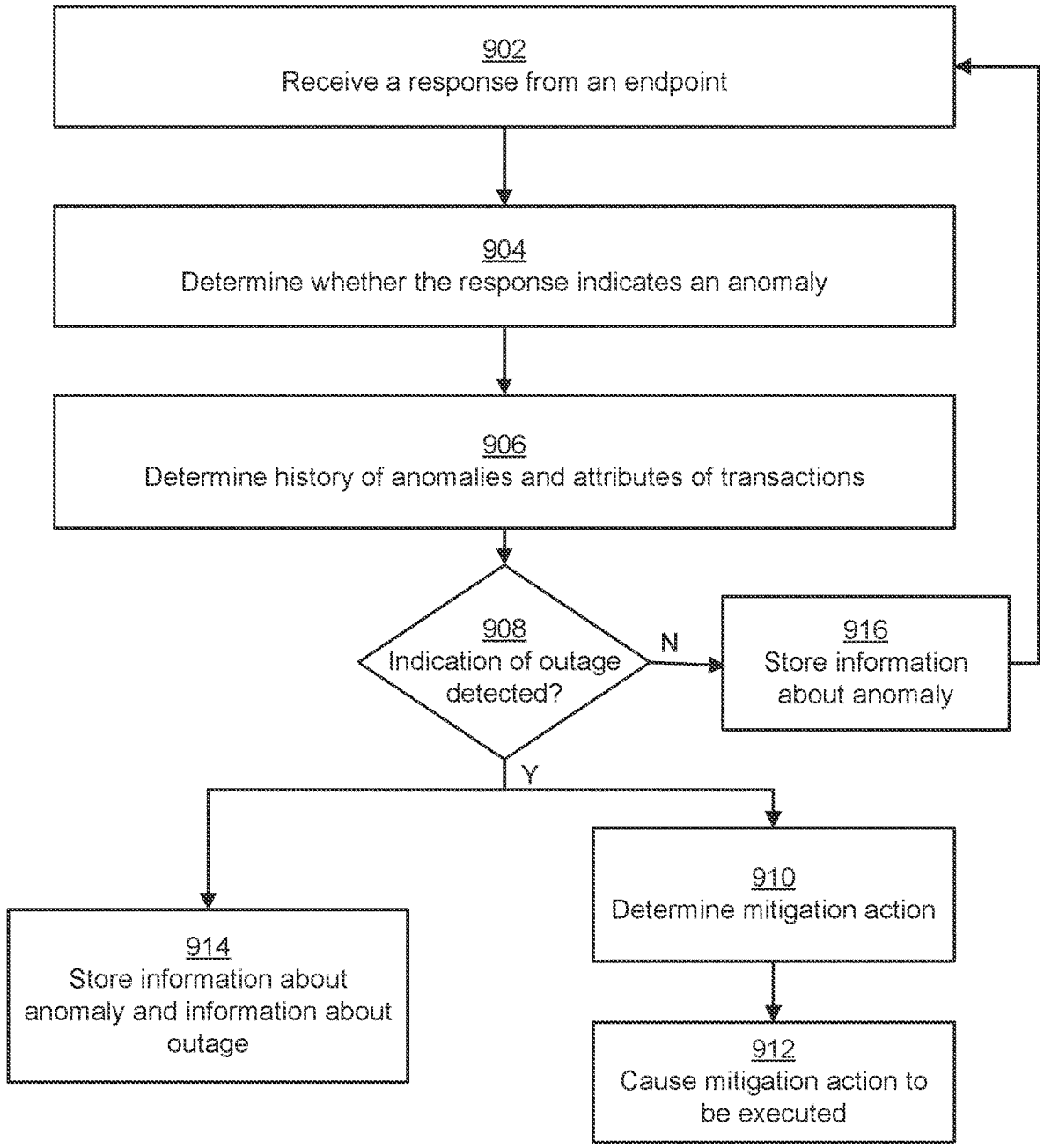
FIG. 9 illustrates an example of a flow for a process of mitigating an outage of a payment service, according to an embodiment of the present disclosure.

FIG. 9 illustrates an example of a flow for a process of mitigating an outage of a payment service, according to an embodiment of the present disclosure. In an example, the flow includes operation 902, where the computer system receives a response from an endpoint. The response can include an indication of an anomaly, or an indication of multiple anomalies, based on the aggregated metrics for a process that are input to the endpoint. Additionally, the response may include a cause of the anomaly, an anomaly score, and a threshold. The cause can correspond to a particular granularity level or to multiple granularity levels.

In an example, the flow includes operation 904, where the computer system determines whether an anomaly is detected. The computer system can determine whether the response includes an indication of an anomaly. The computer system may determine that an anomaly is detected if the anomaly score is above the threshold.

In an example, the flow includes operation 906, where the computer system determines a history of anomalies and attributes of transactions. The history of anomalies and the attributes of transactions are associated with the process and can be received from a data store. The history of anomalies can indicate previous anomalies (or lack thereof) detected for the process over a predefined period of time. The attributes of transactions can indicate a number of impacted transactions and/or a total value of such transactions due to anomalies detected for the process over the predefined period of time.

In an example, the flow includes operation 908, where the computer system determines whether an indication of an outage is detected. The computer system can use the anomaly and the history of anomalies to determine whether the indication of the outage is detected. For example, if the history of anomalies includes a number of anomalies (or frequency and/or pattern per granularity level or across multiple granularity levels) for the process within the predefined time period of the anomaly, the computer system may determine the indication of the outage is detected (which can be specific to a particular granularity level or to multiple granularity levels). The computer system may aggregate multiple outages into a single notification message. So, the computer system may wait until multiple indications of an outage are determined before proceeding. Additionally or alternatively, the computer system may determine whether a reason for the outage is related to an internal system or an external system. If the outage is related to an internal system, the computer system can suppress the notification message. If the computer system determines one or more indications of an outage for an external system, the flow proceeds to operation 910 and 914. Otherwise, the flow proceeds to operation 916 and returns to operation 902.

In an example, the flow includes operation 910, where the computer system determines a mitigation action. The computer system may use the cause of the anomaly from the response from the endpoint to determine the mitigation action. Different causes may be associated with different mitigation actions, so the computer system can perform a lookup to determine the mitigation action. Alternatively, the computer system may input information about the anomaly(ies) and/or outage to a machine learning model that outputs an indication of the mitigation action.

In an example, the flow includes operation 912, where the computer system causes the mitigation action to be executed. The computer system can send instructions to a computing device associated with the process to cause the mitigation action. As an example, the instructions may indicate that the process is to be executed on a different server than a sever currently executing the process.

In an example, the flow includes operation 914, where the computer system stores information about the anomaly and information about the outage. The information about the anomaly can be included in subsequent histories of anomalies for the process. The information about the outage may be used to determine mitigation actions for subsequent outages.

In an example, the flow includes operation 916, where the computer system stores information about the anomaly. Here, the anomaly was detected, but that anomaly is not part of an outage. The computer system stores information related to this anomaly (e.g., the cause, the type, the related process data and/or aggregated metrics, etc.).

Figure 10:
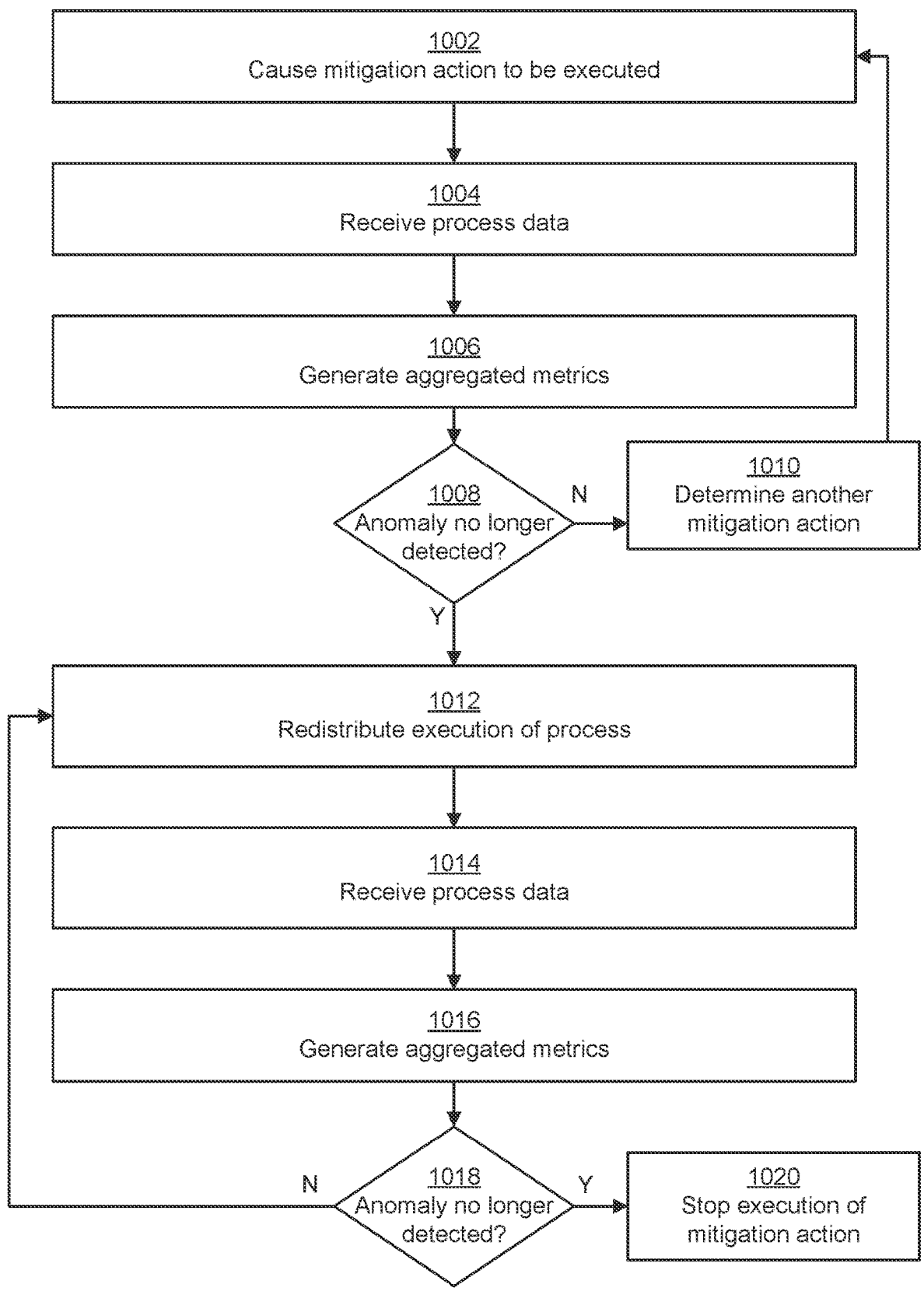
FIG. 10 illustrates an example of a flow for a process of monitoring a mitigation action for a process, according to an embodiment of the present disclosure.

FIG. 10 illustrates an example of a flow for a process of monitoring a mitigation action for a process, according to an embodiment of the present disclosure. In an example, the flow includes operation 1002, where the computer system causes a mitigation action to be executed. The mitigation action can be for a process for which an indication of an outage has been generated. The computer system can send instructions to a service associated with the process to cause the mitigation action. As an example, the instructions may indicate that the process is to be executed on a different server than a server currently executing the process.

In an example, the flow includes operation 1004, where the computer system receives process data. The process data can be for one or more user-initiated transactions subsequent to the mitigation action being executed. The process data can be transformed according to predefined fields for the process.

In an example, the flow includes operation 1006, where the computer system generates aggregated metrics. The aggregated metrics are based on a metrics configuration associated with the process. The metrics configuration can specify metrics that are relevant to successful execution of the process, and the aggregated metrics can include the specified metrics.

In an example, the flow includes operation 1008, where the computer system determines whether an anomaly is no longer detected. The computer system can input the aggregated metrics to an endpoint based on an endpoint configuration for the process. The endpoint can determine whether the execution of the process is associated with an anomaly. If the computer system determines the process is no longer associated with the anomaly, the flow proceeds to operation 1012. Otherwise, the flow proceeds to operation 1010.

In an example, the flow includes operation 1010, where the computer system determines another mitigation action. The other mitigation action can be determined based on a response of the endpoint indicating a cause of the anomaly. Once the computer system determines the other mitigation action, the flow returns to operation 1002.

In an example, the flow includes operation 1012, where the computer system redistributes the execution of the process. For example, the process may have been moved to execute on the different server. The computer system can then begin gradually returning the process to the initial server. For example, every five minutes the computer system may return an additional 10% of the process to the initial server.

In an example, the flow includes operation 1014, where the computer system receives process data. The process data can be for one or more user-initiated transactions subsequent to the execution of the process being redistributed. The process data can be transformed according to predefined fields for the process.

In an example, the flow includes operation 1016, where the computer system generates aggregated metrics. The aggregated metrics are based on the metrics configuration associated with the process. The aggregated metrics are generated based on the process data.

In an example, the flow includes operation 1018, where the computer system determines whether an anomaly is no longer detected. The computer system can input the aggregated metrics to the endpoint based on the endpoint configuration for the process. The endpoint can determine whether the execution of the process is still associated with an anomaly. If the computer system determines the process is no longer associated with the anomaly, the flow proceeds to operation 1020. Otherwise, the flow proceeds to operation 1012, where the redistribution may be to move the process back to the different server.

In an example, the flow includes operation 1020, where the computer system stops the execution of the mitigation action. Once the process is fully redistributed to the initial server and the anomaly is no longer detected, the mitigation action is stopped. The process then continues executing on the initial server for subsequent users.

Figure 11:
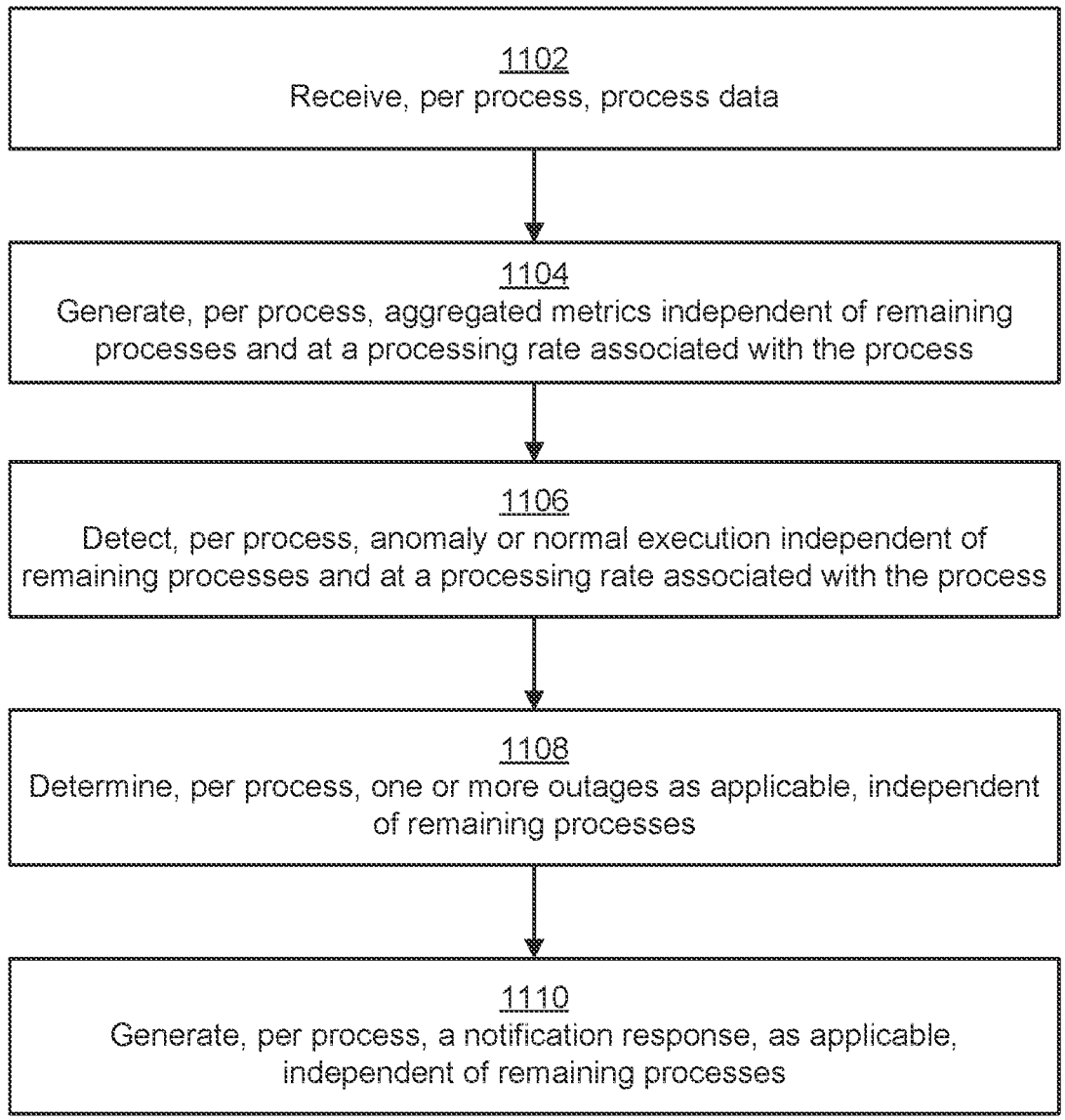
FIG. 11 illustrates an example of a flow for a process of detecting an outage of a process of a payment service independently of other processes of the payment service, according to an embodiment of the present disclosure.

FIG. 11 illustrates an example of a flow for a process of detecting an outage of a process of a payment service independently of other processes of the payment service, according to an embodiment of the present disclosure. In an example, the flow includes operation 1102, where the computer system receives, per process, process data. The process data for each process may be received at different time periods. The process data can correspond to transaction data associated with user-initiated transactions.

In an example, the flow includes operation 1104, where the computer system generates, per process, aggregated metrics independent of the remaining processes and at a processing rate associated with the process. Each of the processes can have different aggregated metrics and different processing rates specified by corresponding metrics configurations.

In an example, the flow includes operation 1106, where the computer system detects, per process, an anomaly or normal execution independent of the remaining processes and at a processing rate associated with the process. The computer system can send the aggregated metrics to a corresponding endpoint specified by a corresponding endpoint configuration. The endpoint configuration for each process can also indicate the processing rate for the process. The endpoint can detect the anomaly or the normal execution of each process independently of the other processes.

In an example, the flow includes operation 1108, where the computer system determines, per process, one or more outages as applicable, independent of the remaining processes. The computer system may determine outages at different granularity levels of each process determined to be associated with an anomaly. To determine the outages, the computer system can receive historical anomaly data for the process.

In an example, the flow includes operation 1110, where the computer system generates, per process, a notification response, as applicable, independent of the remaining processes. The notification response can include mitigation action instructions for a mitigation action for the outage. One notification response may be sent for each detected outage, or a notification response may include an indication of multiple outages (e.g., multiple outages for different granularities of a process or outages for multiple processes).

Figure 12:
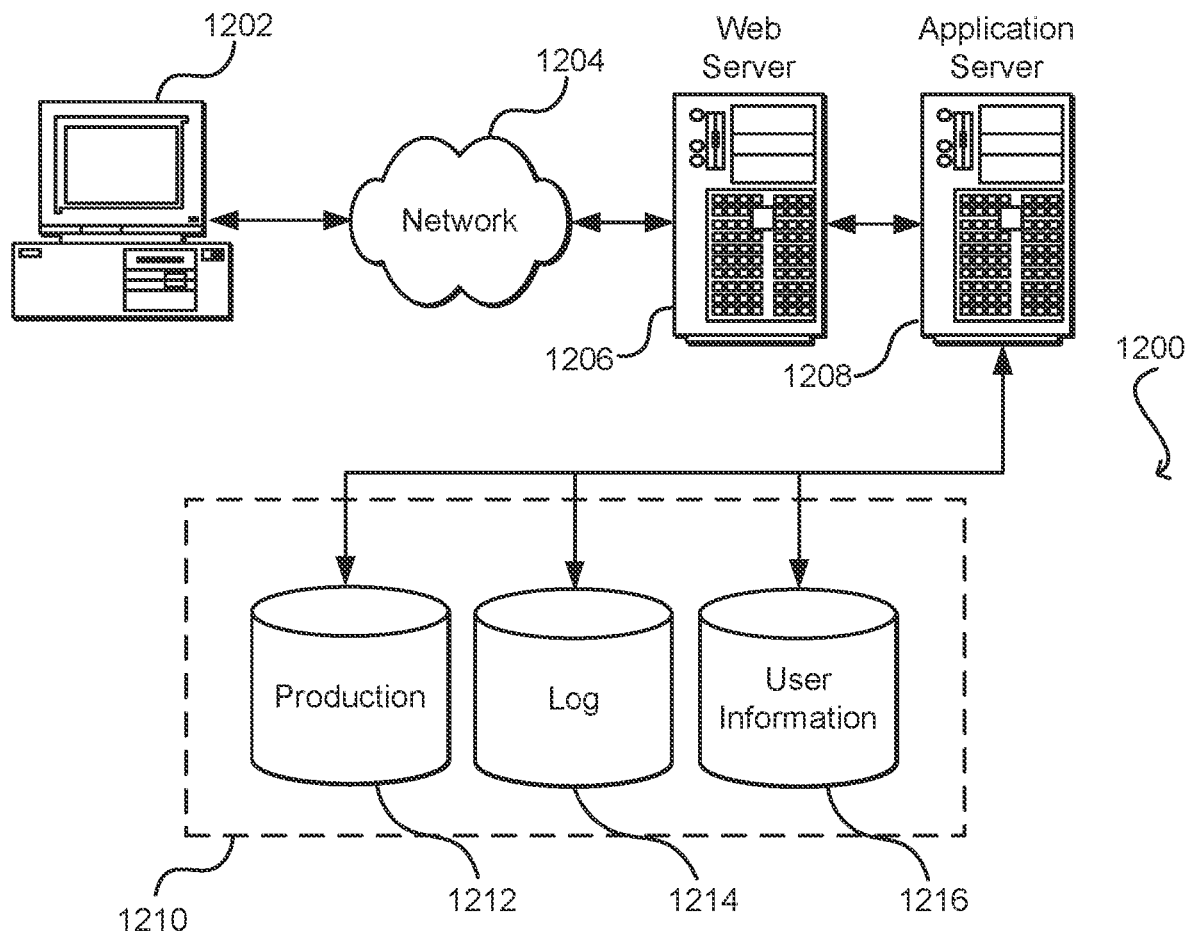
FIG. 12 illustrates aspects of an example environment for implementing aspects in accordance with various embodiments.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Computer-readable storage media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, from a first server, first data associated with a first process of a payment service, the first server executing the first process in support of transactions of a first plurality of users;
    generating first aggregated metrics based at least in part on the first data;
    determining a data processing rate of a machine learning model configured for anomaly detection of the first process, the machine learning model being one of a plurality of machine leaning models of a machine learning engine;
    determining, by inputting the first aggregated metrics to the machine learning engine automatically at the data processing rate, an anomaly associated with the execution of the first process, the anomaly indicated by an output of the machine learning model;
    determining, based at least in part on the anomaly and a history of anomalies associated with the execution of the first process, an indication of an outage associated with the first process; and
    causing, in-real time relative to the first data being received, an execution of a mitigation action based at least in part on the indication of the outage, the execution of the mitigation action being in support of transactions of a second plurality of users and comprises executing the first process on a second server such that processing of a transaction of a user according to the first process is uninterrupted despite the outage.

2. The computer-implemented method of claim 1, further comprising:
    generating second data by at least transforming the first data according to predefined fields; and
    generating the first aggregated metrics from the second data based at least in part on a first metrics configuration associated with the first process.

3. The computer-implemented method of claim 1, further comprising:
    determining a first endpoint of the machine learning engine based at least in part on a first endpoint configuration associated with the first process, wherein the first endpoint includes the machine learning model;
    sending, to the first endpoint, the first aggregated metrics based at least in part on the data processing rate associated with the first process; and
    receiving, from the first endpoint, a first response indicating the anomaly.

4. The computer-implemented method of claim 3, further comprising:
    determining, from the first response, at least one of: a cause of the anomaly, an anomaly score, or a threshold, wherein the indication of the outage is determined based at least in part on the at least one of the cause, the anomaly score, or the threshold; and
    generating a notification message that comprises an identification of the first process and the cause, wherein the mitigation action is caused based at least in part on the notification message.

5. The computer-implemented method of claim 4, wherein the first aggregated metrics are generated based at least in part on a first metrics configuration that comprises a plurality of granularity levels associated with the execution of the first process, wherein the computer-implemented method further comprises:
    determining that the indication of the outage is associated with at least one granularity level of the plurality of granularity levels; and
    including, in the notification message, information about the at least one granularity level.

6. The computer-implemented method of claim 3, further comprising:
    determining the data processing rate based at least in part on the first endpoint configuration associated with the first process;
    receiving, from the first server, second data associated with the first process;
    generating second aggregated metrics based at least in part on the second data; and
    sending, to the first endpoint, the first aggregated metrics and the second aggregated metrics based at least in part on the data processing rate.

7. The computer-implemented method of claim 1, further comprising:
    determining, based at least in part on the output of the machine learning model, a cause, an anomaly score, and a threshold associated with the anomaly; and
    determining the indication of the outage based at least in part on the cause, the anomaly score and the threshold of the anomaly and on a history of causes, a history of anomaly scores, and a history of thresholds associated with the history of anomalies.

8. The computer-implemented method of claim 1, further comprising:
    receiving, based at least in part on the execution of the mitigation action, second data associated with the execution of the first process in support of the transactions of the second plurality of users;
    generating second aggregated metrics based at least in part on the second data;
    determining, by using the second aggregated metrics as first input to the machine learning engine, that no further anomaly associated with the execution of the first process is detected; and
    causing the execution of the mitigation action to stop, wherein the execution of the first process continues in support of transactions of a third plurality of users.

9. A system comprising:
one or more processors; and
one or more memories storing computer-readable instructions that, upon execution by the one or more processors, configure the system to:
receive, from a first server, first data associated with a first process of a payment service, the first server executing the first process in support of transactions of a first plurality of users;
generate first aggregated metrics based at least in part on the first data;
determine a data processing rate of a machine learning model configured for anomaly detection of the first process, the machine learning model being one of a plurality of machine leaning models of a machine learning engine;
determine, by inputting the first aggregated metrics to the machine learning engine automatically at the data processing rate, an anomaly associated with the execution of the first process, the anomaly indicated by an output of the machine learning model;
determine, based at least in part on the anomaly and a history of anomalies associated with the execution of the first process, an indication of an outage associated with the first process; and
cause, in-real time relative to the first data being received, an execution of a mitigation action based at least in part on the indication of the outage, the execution of the mitigation action being in support of transactions of a second plurality of users and comprises executing the first process on a second server such that processing of a transaction of a user according to the first process is uninterrupted despite the outage.

10. The system of claim 9, wherein the anomaly, the mitigation action, and the outage are a first anomaly, a first mitigation action, and a first outage, respectively, and wherein the one or more memories store computer-readable additional instructions that, upon execution by the one or more processors, further configure the system to:
receive, from a third server, second data associated with a second process of the payment service, the third server executing the second process in support of the transactions of the first plurality of users;
generate second aggregated metrics based at least in part on the second data;
determine, by using the second aggregated metrics as second input to the machine learning engine, a second anomaly associated with the execution of the second process;
determine, based at least in part on the second anomaly, an indication of a second outage associated with the second process; and
cause an execution of a second mitigation action based at least in part on the indication of the second outage, the execution of the second mitigation action being in support of the transactions of the second plurality of users.

11. The system of claim 10, wherein the second anomaly and the indication of the second outage are determined independently of the first anomaly and the indication of the first outage.

12. The system of claim 9, wherein the first aggregated metrics are generated based at least in part on a first metrics configuration that comprises a plurality of granularity levels associated with the execution of the first process, and wherein the one or more memories store computer-readable additional instructions that, upon execution by the one or more processors, further configure the system to:
determine a plurality of anomalies based at least in part on an output of the machine learning engine, wherein each one of the plurality of anomalies is associated with a different granularity level of the plurality of granularity levels; and
determine outage indications associated with the execution of the first process based at least in part on the plurality of anomalies.

13. The system of claim 12, wherein the one or more memories store computer-readable further instructions that, upon execution by the one or more processors, additionally configure the system to:
generate a notification message based at least in part on the outage indications, wherein the mitigation action is caused based at least in part on the notification message, and wherein the notification message indicates granularity levels associated with the plurality of anomalies.

14. The system of claim 9, wherein the one or more memories store computer-readable additional instructions that, upon execution by the one or more processors, further configure the system to:
determine a first endpoint from a plurality of endpoints of the machine learning engine, wherein each one of the plurality of endpoints is associated with a different process of the payment service and comprises a different machine learning model;
send, to the first endpoint, the first aggregated metrics; and
receive, from the first endpoint, a first response indicating the anomaly.

15. The system of claim 14, wherein the first endpoint comprises the machine learning model, wherein the machine learning model is trained based at least in part on first training data associated with the first process of the payment service, wherein a second endpoint of the plurality of endpoints is associated with a second process of the payment service and comprises a second machine learning model, and wherein the second machine learning model is trained based at least in part on second training data associated with the second process of the payment service.

16. The system of claim 15, wherein the first training data comprises at least one of collected data or synthetic data about outages associated with the execution of the first process, and wherein the one or more memories store computer-readable further instructions that, upon execution by the one or more processors, additionally configure the system to:
store first information from the first response and second information indicating the outage, wherein the machine learning model is further trained based at least in part on the first information and the second information.

17. One or more non-transitory computer-readable storage media storing instructions that, upon execution on a system, cause the system to perform operations comprising:
receiving, from a first server, first data associated with a first process of a payment service, the first server executing the first process in support of transactions of a first plurality of users;
generating first aggregated metrics based at least in part on the first data;
determining a data processing rate of a machine learning model configured for anomaly detection of the first process, the machine learning model being one of a plurality of machine leaning models of a machine learning engine;

determining, by inputting the first aggregated metrics to the machine learning engine automatically at the data processing rate, an anomaly associated with the execution of the first process, the anomaly indicated by an output of the machine learning model;

determining, based at least in part on the anomaly and a history of anomalies associated with the execution of the first process, an indication of an outage associated with the first process; and causing, in-real time relative to the first data being received, an execution of a mitigation action based at least in part on the indication of the outage, the execution of the mitigation action being in support of transactions of a second plurality of users and comprises executing the first process on a second server such that processing of a transaction of a user according to the first process is uninterrupted despite the outage.

18. The one or more non-transitory computer-readable storage media of claim 17, wherein:

prior to inputting the first aggregated metrics to the machine learning engine, the machine learning model is trained based at least in part on first training data, and after the output of the machine learning model, the machine learning model is further trained based at least in part on second training data such that a performance metric of the machine learning model is improved, wherein the second training data is based at least in part on the output.

19. The one or more non-transitory computer-readable storage media of claim 18, wherein the second training data is generated based at least in part on a configuration defining parameters to be collected such that to improve the performance metric, wherein the parameters are collected after the output of the machine learning model is generated and includes latency and a ratio of training and testing.

20. The one or more non-transitory computer-readable storage media of claim 18, wherein the second training data comprises first collected data and first synthetic data about first outages associated with the execution of the first process on the first server, and wherein the second training data comprises second collected data and second synthetic data about second outages associated with the execution of the first process on the second server.

* * * * *

UNITED STATES PATENT AND TRADEMARK OFFICE
CERTIFICATE OF CORRECTION

PATENT NO. : 12,026,718 B1
APPLICATION NO. : 17/532142
DATED : July 2, 2024
INVENTOR(S) : Ragheb Rahmaniani et al.

Page 1 of 1

It is certified that error appears in the above-identified patent and that said Letters Patent is hereby corrected as shown below:

In the Claims

Column 23, Line 36, Claim 1:
Delete: "machine leaning models"
Add: machine learning models Column 25, Line 15, Claim 9:
Delete: "machine leaning models"
Add: machine learning models Column 27, Line 2, Claim 17:
Delete: "machine leaning models"
Add: machine learning models Signed and Sealed this
Twentieth Day of May, 2025

Coke Morgan Stewart
*Acting Director of the United States Patent and Trademark Office*